(12) United States Patent
Miyazaki et al.

(10) Patent No.: US 12,296,474 B2
(45) Date of Patent: May 13, 2025

(54) POSITION DETECTION METHOD, CONTROLLER, AND ROBOT SYSTEM

(71) Applicant: Kawasaki Jukogyo Kabushiki Kaisha, Kobe (JP)

(72) Inventors: Toshihiko Miyazaki, Kobe (JP); Jun Takebayashi, Kobe (JP); Akio Yoda, Kobe (JP); Toshiyuki Tsujimori, Kobe (JP); Satoshi Ouchi, Kobe (JP); Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 323 days.

(21) Appl. No.: 17/784,683

(22) PCT Filed: Dec. 14, 2020

(86) PCT No.: PCT/JP2020/046568
§ 371 (c)(1),
(2) Date: Jun. 13, 2022

(87) PCT Pub. No.: WO2021/117907
PCT Pub. Date: Jun. 17, 2021

(65) Prior Publication Data
US 2023/0028767 A1    Jan. 26, 2023

(30) Foreign Application Priority Data
Dec. 13, 2019  (JP) .................. 2019-225623

(51) Int. Cl.
*B25J 9/10*      (2006.01)
*B25J 9/16*      (2006.01)

(52) U.S. Cl.
CPC ............ *B25J 9/10* (2013.01); *B25J 9/1653* (2013.01)

(58) Field of Classification Search
CPC . B25J 9/10; B25J 9/1653; B25J 9/1633; B25J 9/1697; B25J 9/1682; B25J 9/06; G05B 2219/39102; G05B 2219/40625
See application file for complete search history.

(56) References Cited

U.S. PATENT DOCUMENTS

| | | | |
|---|---|---|---|
| 6,996,456 B2 * | 2/2006 | Cordell | G05B 19/425 700/262 |
| 2009/0093908 A1 * | 4/2009 | Hashimoto | H01L 21/67778 901/33 |

(Continued)

FOREIGN PATENT DOCUMENTS

| | | |
|---|---|---|
| CN | 104339352 A | 2/2015 |
| JP | 2006-503721 A | 2/2006 |

(Continued)

*Primary Examiner* — Abby Y Lin
*Assistant Examiner* — Dylan M Katz
(74) *Attorney, Agent, or Firm* — XSENSUS LLP

(57) ABSTRACT

A method includes: (a) causing a robotic arm to position a contacting structure of the arm laterally in a horizontal direction in relation to a first subject on a target object; (b) causing the arm to bring the contacting structure into contact with at least three locations on the first subject; (c) detecting positions of the contacting structure in relation to the robot when contacting the locations; (d) detecting a position of the first subject in relation to the robot by using the detected positions of the contacting structure; (e) performing same steps as the steps (a) to (d) for a second subject on the target object; and (f) detecting a position of the robot in relation to the target object by using the positions of the subjects in relation to the robot and using positions of the subjects in relation to the target object.

12 Claims, 11 Drawing Sheets

(56) References Cited

U.S. PATENT DOCUMENTS

| | | | |
|---|---|---|---|
| 2010/0057257 A1* | 3/2010 | Ichikawa | G05B 19/4083 |
| | | | 700/264 |
| 2015/0045953 A1 | 2/2015 | Nagai et al. | |
| 2016/0052135 A1* | 2/2016 | Motoyoshi | B25J 9/1687 |
| | | | 29/281.6 |
| 2019/0232493 A1* | 8/2019 | Takeuchi | B25J 9/161 |
| 2019/0299415 A1* | 10/2019 | Pollack | G01N 35/00693 |
| 2021/0031372 A1* | 2/2021 | Ooba | B25J 9/1697 |

FOREIGN PATENT DOCUMENTS

| | | |
|---|---|---|
| JP | 2018-031701 A | 3/2018 |
| WO | 2004/037498 A1 | 5/2004 |

* cited by examiner

POSITION DETECTION METHOD, CONTROLLER, AND ROBOT SYSTEM

CROSS-REFERENCE TO RELATED APPLICATION APPLICATIONS

This application is based on PCT filing PCT/JP2020/046568, filed Dec. 14, 2020, which claims priority to and the benefit of Japanese Patent Application No. 2019-225623, filed on Dec. 13, 2019, the entire disclosure of each of which is incorporated herein by reference.

TECHNICAL FIELD

The present disclosure relates to a position detection method, a controller, and a robot system.

BACKGROUND ART

Conventionally, it has been done to teach a robot a positional relationship between the robot and a work object. For example, Patent Literature 1 discloses a method of teaching a robot a position within a work environment by using a tactile sensor. The robot includes an arm with an end effector. The end effector includes a tactile sensor device including a touch sensitive surface. The robot brings the touch sensitive surface into contact with a work object, and the tactile sensor device generates a signal indicating the position of the contact with respect to the touch sensitive surface. Further, by using information including the generated signal, the position of the contact in the work environment is taught to the robot.

CITATION LIST

Patent Literature

PTL 1: Japanese National Phase PCT Laid-Open Application Publication No. 2006-503721

SUMMARY OF INVENTION

In Patent Literature 1, the tactile sensor device including the touch sensitive surface is used to detect a positional relationship between the robot and the work object. In a case where high positional precision is required, a high-precision tactile sensor device is necessary, which causes increase in cost and increase in complexity of equipment. Moreover, when the robot with the tactile sensor device mounted thereto performs work, it may cause deterioration in the precision of the tactile sensor device, and consequently, calibration may become necessary, which complicates the work for the detection.

An objective of the present disclosure is to provide a position detection method, a controller, and a robot system that simplify the detection of a positional relationship between a robot and a target object.

In order to achieve the above objective, a position detection method according to one aspect of the present disclosure is a position detection method of detecting a position of a robot in relation to a target object, the robot including an arm. The method includes: (a) causing the arm, on which a contacting structure is disposed, to position the contacting structure laterally in a horizontal direction in relation to a first detection subject that is one of at least two detection subjects disposed on the target object; (b) causing the arm to move the contacting structure laterally to bring the contacting structure into contact with at least three locations on a surface of the first detection subject; (c) detecting positions of the contacting structure in relation to the robot when the contacting structure comes into contact with the at least three locations, respectively; (d) detecting a position of the first detection subject in relation to the robot by using the detected at least three positions of the contacting structure; (e) performing same steps as the steps (a) to (d) for another detection subject, different from the first detection subject, of the at least two detection subjects; and (f) detecting the position of the robot in relation to the target object by using the positions of the at least two detection subjects in relation to the robot and using positions of the at least two detection subjects in relation to the target object.

The technique of the present disclosure makes it possible to simplify the detection of a positional relationship between the robot and the target object.

DESCRIPTION OF EMBODIMENTS

Figure 1:
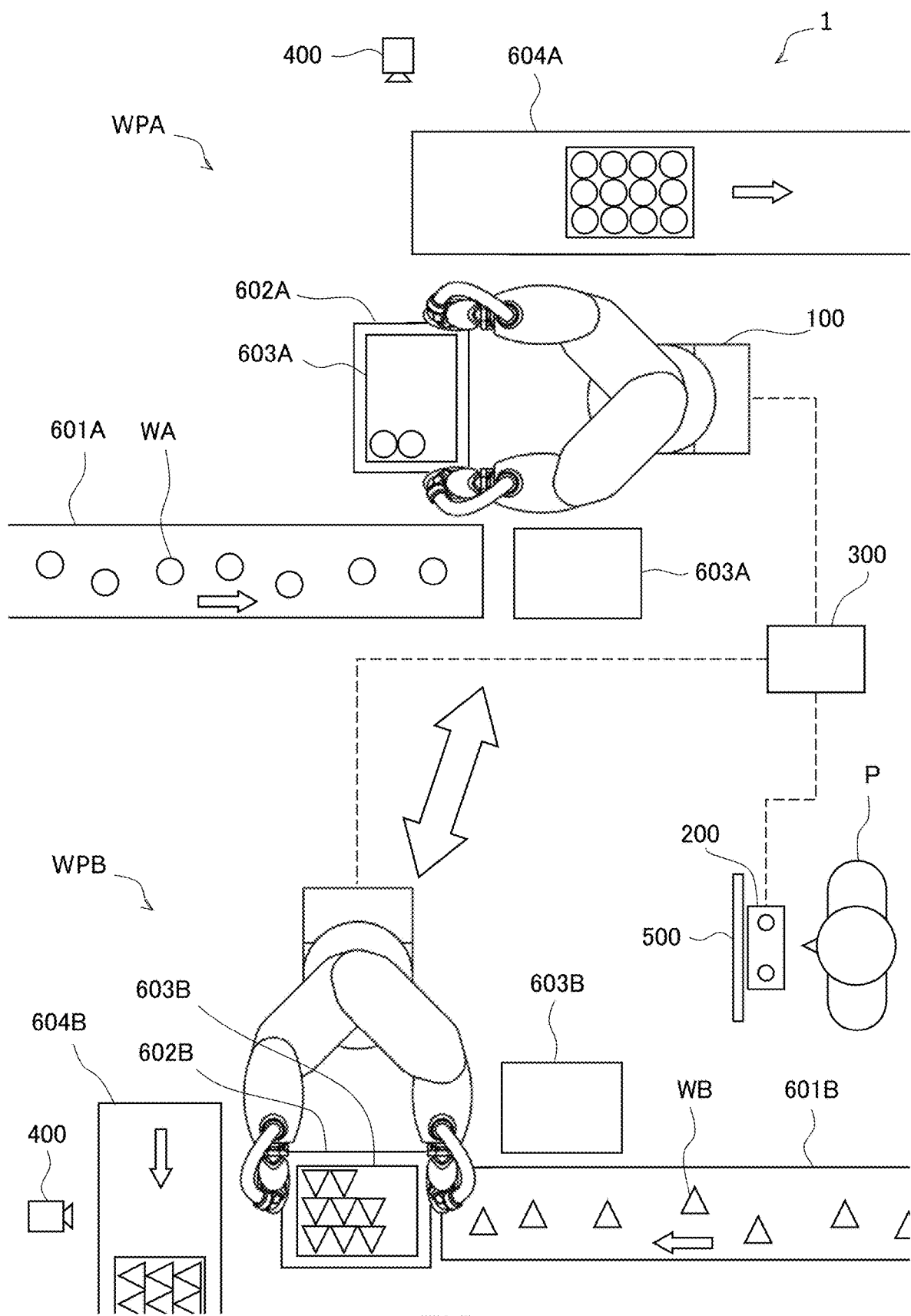
FIG. 1 shows one example of the configuration of a robot system according to an embodiment.

First, each exemplary aspect of the present disclosure is described. A position detection method according to one aspect of the present disclosure is a position detection method of detecting a position of a robot in relation to a target object, the robot including an arm. The method includes: (a) causing the arm, on which a contacting structure is disposed, to position the contacting structure laterally in a horizontal direction in relation to a first detection subject that is one of at least two detection subjects disposed on the target object; (b) causing the arm to move the contacting structure laterally to bring the contacting structure into contact with at least three locations on a surface of the first detection subject; (c) detecting positions of the contacting structure in relation to the robot when the contacting structure comes into contact with the at least three locations, respectively; (d) detecting a position of the first detection subject in relation to the robot by using the detected at least three positions of the contacting structure; (e) performing same steps as the steps (a) to (d) for another detection subject, different from the first detection subject, of the at least two detection subjects; and (f) detecting the position of the robot in relation to the target object by using the positions of the at least two detection subjects in relation to the robot and using positions of the at least two detection subjects in relation to the target object.

According to the above aspect, for each detection subject, the positions of the contacting structure in relation to the robot when the contacting structure comes into contact with the at least three locations on the detection subject, respectively, are detected, and thereby the position of each detection subject in relation to the robot is detected. Further, the position of the robot in relation to the target object is detected by using the position of each detection subject in relation to the robot. The position detection as above can be realized by disposing the contacting structure on the arm of the robot and through the above-described operations by the robot. Therefore, the detection of the positional relationship between the robot and the target object is simplified.

In the position detection method according to the aspect of the present disclosure, each of the at least two detection subjects may be one of a recess or a projection, the projection being insertable in the recess. The contacting structure may be the other of the recess or the projection. The method may include, in the step (a), positioning the contacting structure laterally in relation to the first detection subject by moving the contacting structure such that the projection is inserted in the recess. According to this aspect, in the step (b), the contacting structure is moved laterally in a state where the projection is inserted in the recess. The range of movement of the contacting structure is restricted by the recess. Consequently, an arm operation for bringing the contacting structure and the detection subject into contact with each other is made simple and fast.

In the position detection method according to the aspect of the present disclosure, the method may include, in the step (f), detecting the position and an orientation of the robot in relation to the target object. According to this aspect, the detection of a precise positional relationship between the robot and the target object is simplified.

In the position detection method according to the aspect of the present disclosure, the arm may include at least two joints. The method may include, in the step (b), at each of the at least three locations, performing a first operation of operating a first joint, which is one of the at least two joints, to bring the contacting structure into contact with the surface of the first detection subject, and then performing a second operation of operating a second joint, which is another one of the at least two joints, to bring the contacting structure into contact with the surface of the first detection subject. According to this aspect, in the first operation, it is possible that due to a large moving amount of the contacting structure, the contacting structure collides against and bounces off the surface of the detection subject. In the second operation, the moving amount of the contacting structure can be made small, and therefore, the contacting structure can be kept in contact with the surface of the detection subject. In each of the first operation and the second operation, the contacting structure is brought into contact with the detection subject while the first joint or the second joint is operating, and thereby influence on the operations, the influence being caused by mechanical rattling (e.g., backlash) at the first joint and the second joint, is reduced. This makes it possible to detect a precise position of each part of the arm at the time of making a contact. Since the first joint and the second joint operate independently of each other, a moving amount of each joint until the contacting structure and the detection subject come into contact with each other can be readily detected.

In the position detection method according to the aspect of the present disclosure, the first joint and the second joint may enable the arm to operate in a manner to move the contacting structure laterally. According to this aspect, influence on the operation of the first joint, the influence being caused by mechanical rattling (e.g., backlash) at the second joint, is reduced, and also, influence on the operation of the second joint, the influence being caused by mechanical rattling (e.g., backlash) at the first joint, is reduced.

In the position detection method according to the aspect of the present disclosure, the method may include: in the first operation, lowering a gain of a second servomotor that drives the second joint than a gain of a first servomotor that drives the first joint; and in the second operation, lowering the gain of the first servomotor than the gain of the second servomotor. According to this aspect, in the first operation, influence on the operation of the first joint driven by the first servomotor, the influence being caused by the driving force of the second servomotor for maintaining the state of the second joint, is reduced, whereas in the second operation, influence on the operation of the second joint driven by the second servomotor, the influence being caused by the driving force of the first servomotor for maintaining the state of the first joint, is reduced.

The position detection method according to the aspect of the present disclosure may further include: (g) causing the arm to perform an operation of indicating a type of control that is currently being performed among multiple types of control corresponding to respective target objects. According to this aspect, a user of the robot can visually recognize a process that is currently being performed by the robot.

The position detection method according to the aspect of the present disclosure may further include: (a1) causing the arm to position the contacting structure to a position above a peripheral surface around the first detection subject; (b1) causing the arm to lower the contacting structure to bring the contacting structure into contact with at least one location on the peripheral surface; (c1) detecting a height position of the contacting structure when the contacting structure comes into contact with each of the at least one location, the height position being a position of the contacting structure in a height direction in relation to the robot; (d1) detecting a height position of the first detection subject in relation to the robot by using the detected at least one height position of the contacting structure; and (e1) detecting a height position of the robot in relation to the target object by using the height position of the first detection subject in relation to the robot. According to this aspect, the detection of the height position of the robot in relation to the target object can be realized by disposing the contacting structure on the arm of the robot and through the above-described operations by the robot.

A controller according to one aspect of the present disclosure is a controller for performing the position detection method according to the aspect of the present disclosure. The controller: performs the step (a) in accordance with manipulation information outputted from a manipulation input device with which to manipulate the robot, the manipulation input device receiving an input of a manipulation of the robot; and performs the steps (b) to (f) autonomously in accordance with a program. According to this aspect, the controller can perform the steps (a) to (f) even if an approximate position of each detection subject in relation to the robot is unknown.

A controller according to one aspect of the present disclosure is a controller for performing the position detection method according to the aspect of the present disclosure. The controller may perform the steps (a) to (f) autonomously in accordance with a program. According to this aspect, the controller can perform the steps (a) to (f) autonomously.

A robot system according to one aspect of the present disclosure includes: a controller that performs the position detection method according to the aspect of the present disclosure and controls an operation of the robot; and the robot. According to this aspect, the same advantageous effects as those of the controller according to the aspect of the present disclosure are obtained.

In the robot system according to the aspect of the present disclosure, the controller may: perform the step (a) in accordance with manipulation information outputted from a manipulation input device with which to manipulate the robot, the manipulation input device receiving an input of a manipulation of the robot; and perform the steps (b) to (f) autonomously in accordance with a program. According to this aspect, the same advantageous effects as those of the controller according to the aspect of the present disclosure are obtained.

In the robot system according to the aspect of the present disclosure, the controller may perform the steps (a) to (f) autonomously in accordance with a program. According to this aspect, the same advantageous effects as those of the controller according to the aspect of the present disclosure are obtained.

Embodiments

Hereinafter, embodiments of the present disclosure are described with reference to the drawings. The embodiments below each describe comprehensive or specific examples. Among components described in the embodiments below, components that are not recited in an independent claim defining the most generic concept of the present disclosure are described as optional components. Each of the accompanying drawings is a schematic drawing, and is not necessarily an exactly illustrated drawing. In each drawing, substantially the same components are denoted by the same reference signs, and in some cases, redundant descriptions are omitted or simplified. In the present specification and the claims, "an apparatus" or "a device" can mean not only a single apparatus or a single device, but also a system including multiple apparatuses or multiple devices.

[Configuration of Robot System]

Hereinafter, the configuration of a robot system 1 according to an embodiment is described. FIG. 1 shows one example of the configuration of the robot system 1 according to the embodiment. As shown in FIG. 1, the robot system 1 includes a robot 100, a manipulation input device 200, a controller 300, imaging devices 400, and a presentation device 500. As a non-limiting example, in the present embodiment, the robot system 1 causes the robot 100 to autonomously perform two different types of work at different positions, respectively.

For example, in a workplace WPA, the robot 100 packs articles WA conveyed by a belt conveyer 601A into a container box 603A on a placement table 602A, and places the container box 603A in which the articles WA have been packed onto another belt conveyer 604A, which conveys the container box 603A to another workplace. Also, in a workplace WPB, the robot 100 packs articles WB conveyed by a belt conveyer 601B into a container box 603B on a placement table 602B, and places the container box 603B in which the articles WB have been packed onto another belt conveyer 604B, which conveys the container box 603B to another workplace. It is necessary to move the robot 100 between the workplace WPA and the workplace WPB. Each time the robot 100 is moved, it is necessary to teach a position to the robot 100. Specifically, in the workplace WPA, it is necessary to store, in the controller 300, the positions of, for example, the robot 100 and the belt conveyer 601A relative to each other. In the workplace WPB, it is necessary to store, in the controller 300, the positions of, for example, the robot 100 and the belt conveyer 601B relative to each other.

In the present embodiment, in each of the workplace WPA and the workplace WPB, based on the above relative positions, the controller 300 causes the robot 100 to autonomously perform predetermined work, such as packing work, in accordance with a program. The work performed by the robot 100 is not limited to the work illustratively described in the present embodiment, but may be any work. The controller 300 controls the operations of the robot 100 by autonomous control and manipulation control. The autonomous control causes the robot 100 to operate autonomously in accordance with a program. The manipulation control causes the robot 100 to operate in accordance with manipulation information corresponding to a manipulation that is inputted via the manipulation input device 200.

Figure 2:
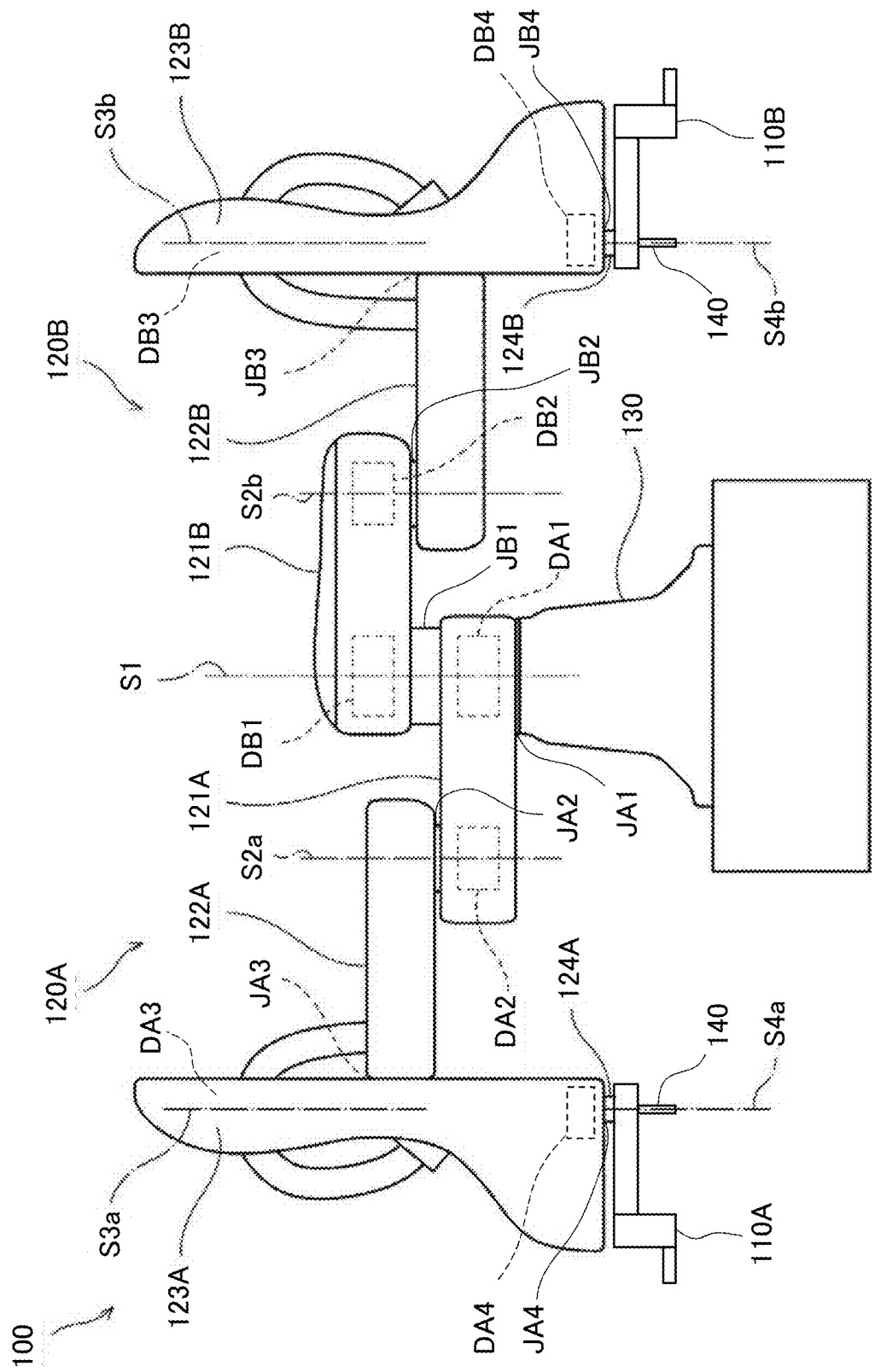
FIG. 2 is a side view showing one example of the configuration of a robot according to the embodiment.

FIG. 2 is a side view showing one example of the configuration of the robot 100 according to the embodiment. As shown in FIG. 1 and FIG. 2, in the present embodiment, the robot 100 is an industrial robot as a non-limiting example. The robot 100 includes end effectors 110A and 110B, arms 120A and 120B, a base 130, and inserts 140. The end effectors 110A and 110B perform actions on workpieces, such as the articles WA and WB. The arms 120A and 120B move the respective end effectors 110A and 110B so as to perform the actions. The arms 120A and 120B are robotic arms. The arms 120A and 120B are rotatably supported by the base 130. The base 130 is placed on a movable apparatus such as a transporter, and is thus movable. Examples of the transporter include wheels and an AGV (Automated Guided Vehicle). The inserts 140 are disposed on the respective end effectors 110A and 110B. Specifically, the inserts 140 are disposed on the distal ends of the respective arms 120A and 120B, and are used in an operation of detecting the position of the robot 100.

The arms 120A and 120B are not particularly limited, so long as the arms 120A and 120B are capable of moving the respective end effectors 110A and 110B disposed on their distal ends. In the present embodiment, the arms 120A and 120B are horizontal articulated arms. Each of the arms 120A and 120B may be, for example, a vertical articulated arm, a polar coordinate arm, a cylindrical coordinate arm, a Cartesian coordinate arm, or yet another type of robotic arm. The arms 120A and 120B are coaxially rotatable about a vertical first axis S1 in respective horizontal planes. The arm 120A is disposed to be shifted downward in the direction of the first axis S1 in relation to the arm 120B. The robot 100 is a coaxial dual-arm robot.

The arm 120A includes links 121A to 124A, joints JA1 to JA4, and drivers DA1 to DA4. The arm 120B includes links 121B to 124B, joints JB1 to JB4, and drivers DB1 to DB4. The drivers DA1 to DA4 and DB1 to DB4 include, for example, electric motors using electricity as the source of power. In the present embodiment, the drivers DA1 to DA4 and DB1 to DB4 include servomotors. The drivers DA1 to DA4 and DB1 to DB4 are controlled by the controller 300 to drive the joints JA1 to JA4 and JB1 to JB4, respectively. Accordingly, the arms 120A and 120B operate independently of each other. The number of joints of each of the arms 120A and 120B is not limited to four, but may be five or more, or may be three or less.

The links 121A and 121B are connected to the base 130 via the rotary joints JA1 and JB1, respectively, such that the links 121A and 121B are rotatable about the first axis S1 in respective horizontal planes. The links 122A and 122B are connected to the distal ends of the links 121A and 121B via the rotary joints JA2 and JB2, respectively, such that the links 122A and 122B are rotatable about respective vertical second axes S2$a$ and S2$b$ in respective horizontal planes. The links 123A and 123B are connected to the distal ends of the links 122A and 122B via the linear-motion joints JA3 and JB3, respectively, such that the links 123A and 123B can be lifted and lowered along respective vertical third axes S3$a$ and S3$b$. The links 124A and 124B are connected to the lower ends of the links 123A and 123B via the rotary joints JA4 and JB4, respectively, such that the links 124A and 124B are rotatable about respective longitudinal fourth axes S4$a$ and S4$b$ of the links 123A and 123B. The fourth axes S4$a$ and S4$b$ are vertical axes. Each of the links 124A and 124B includes a mechanical interface to connect to a corresponding one of the end effectors 110A and 110B.

The term "horizontal direction" herein means, in a case where the robot 100 is disposed on a horizontal surface such as a horizontal floor surface, a horizontal direction parallel to the surface. The term "vertical direction" herein means, in the same case, a vertical direction perpendicular to the aforementioned surface. The term "upward" herein means, in the same case, a direction from the lower side toward the upper side. The term "downward" herein means, in the same case, a direction from the upper side toward the lower side. The term "lateral" or "laterally" herein means, in the same case, a direction extending along the aforementioned surface.

Figure 3:
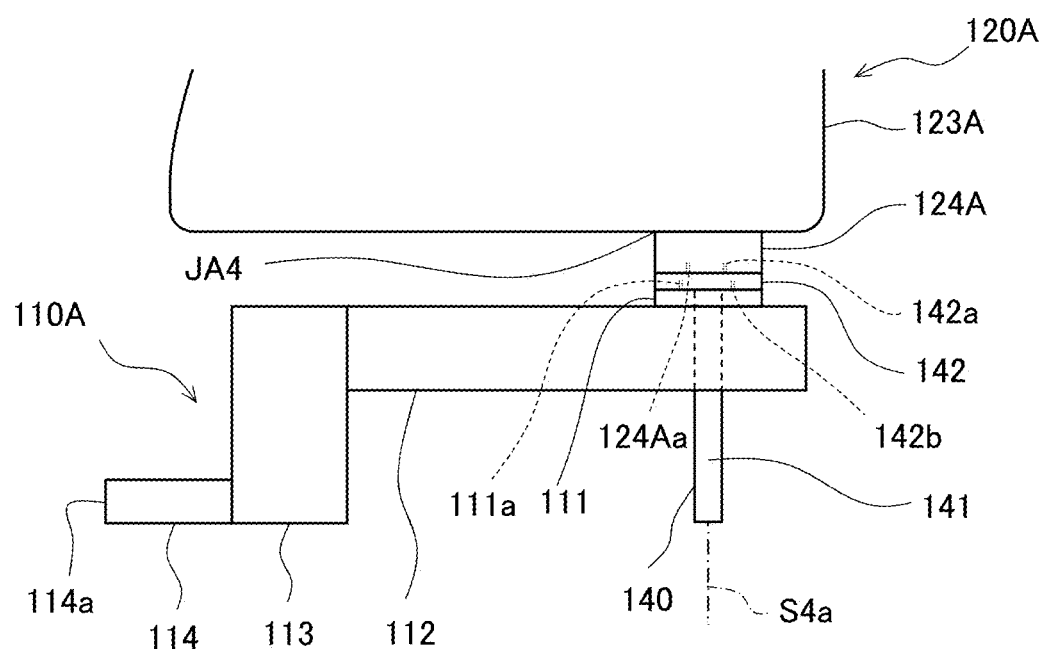
FIG. 3 is a side view showing one example of the configuration of an end effector according to the embodiment.

FIG. 3 is a side view showing one example of the configuration of the end effector 110A according to the embodiment. As shown in FIG. 2 and FIG. 3, the end effectors 110A and 110B are the same in configuration. Therefore, hereinafter, only the configuration of the end effector 110A is described, and the description of the configuration of the end effector 110B is omitted. The end effector 110A includes a connector 111, a support 112, a driver 113, and a gripper 114.

The support 112 extends in a direction perpendicular the fourth axis S4$a$. The connector 111 is disposed on one end of the support 112 in its extending direction. The driver 113 is disposed on the other end of the support 112 in its extending direction. The connector 111 is connected to the mechanical interface of the link 124A via the insert 140. The driver 113 is mechanically connected to two gripping claws 114$a$ of the gripper 114, and is capable of causing the gripping claws 114$a$ to move toward each other and away from each other. Each gripping claw 114$a$ extends in a direction crossing the fourth axis S4$a$. In the present embodiment, each gripping claw 114$a$ extends in a direction perpendicular to the fourth axis S4$a$. The gripping claws 114$a$ grip a workpiece such as an article WA or WB by moving toward each other, and stop gripping the workpiece by moving away from each other. The driver 113 includes, for example, an electric motor that uses electricity as the source of power. In the present embodiment, the driver 113 includes a servomotor. The driver 113 is controlled by the controller 300 to drive the gripping claws 114$a$.

The insert 140 includes a shaft 141 and a connector 142. In the present embodiment, a single member serves as both the shaft 141 and the connector 142. Alternatively, the shaft 141 and the connector 142 may be dividable from each other. The connector 142 is connected to the mechanical interface of the link 124A. The connector 142 is disc-shaped and includes a circular surface similar to the surface of the mechanical interface. The connector 142 includes a protrusion 142$a$ on the aforementioned circular surface. The protrusion 142$a$ may be integrated with the connector 142, or may be attachable to and detachable from the connector 142. The protrusion 142$a$ is an annular protrusion that has a planar shape similar to a planar shape of an annular groove 124Aa formed in the surface of the mechanical interface, and is fittable into the groove 124Aa. The connector 142 is positioned at a fixed position in relation to the surface of the mechanical interface as a result of the protrusion 142$a$ being fitted into the groove 124Aa. The shape of each of the protrusion 142$a$ and the groove 124Aa is not limited to an annular shape, so long as the positioning of the connector 142 can be performed by fitting the protrusion 142$a$ to the groove 124Aa. Alternatively, the above-described protrusion and groove may be disposed on the link 124A and in the connector 142, respectively.

The shaft 141 extends in a direction perpendicular to the circular surface of the connector 142 and extends downward opposite the protrusion 142$a$ in a manner to penetrate the connector 111 and the support 112 of the end effector 110A. The shaft 141 projects downward from the support 112. As a non-limiting example, in the present embodiment, the shaft 141 projects downward but not beyond the driver 113 and/or the gripper 114 of the end effector 110A. When the positioning of the connector 142 is performed by fitting the protrusion 142$a$ to the groove 124Aa, the shaft 141 extends coaxially with the fourth axis S4$a$. That is, the center axis of the shaft 141 coincides with the fourth axis S4$a$.

The connector 142 includes an annular groove 142$b$ in its circular surface opposite the protrusion 142$a$. The connector 111 of the end effector 110A includes a protrusion 111$a$ on its surface opposite the support 112. The protrusion 111$a$ may be integrated with the connector 111, or may be attachable to and detachable from the connector 111. The protrusion 111$a$ is an annular protrusion that has a planar shape similar to a planar shape of the groove 142$b$, and is fittable into the groove 142$b$. The connector 111 of the end effector 110A is positioned at a fixed position in relation to the insert 140 and the link 124A as a result of the protrusion 111$a$ being fitted into the groove 142$b$. The shape of each of the protrusion 111$a$ and the groove 142$b$ is not limited to an annular shape, so long as the positioning of the connector 111 can be performed by fitting the protrusion 111$a$ to the groove 142$b$. Alternatively, the above-described protrusion and groove may be disposed on the connector 142 and in the connector 111, respectively.

The insert 140 as above is directly fixed to the link 124A in a state where the connector 142 is sandwiched between the link 124A and the end effector 110A. The robot 100 can perform work in a state where the insert 140 is attached to the link 124A. Alternatively, the insert 140 may be directly fixed to the end effector 110A and indirectly fixed to the link 124A via the end effector 110A. The insert 140 is one example of a contacting structure, and is one example of a projection.

The robot system 1 includes, in each of the workplace WPA and the workplace WPB, detection holes 150$a$ (see FIG. 4), into each of which the shaft 141 of the insert 140 is inserted for detecting the position of the robot 100. The detection holes 150a extend in the vertical direction. For example, members in which the respective detection holes 150a are formed are disposed at predetermined positions, respectively, in each of the workplace WPA and the workplace WPB. Each predetermined position may be a precisely known position or a precisely detectable position.

Figure 4:
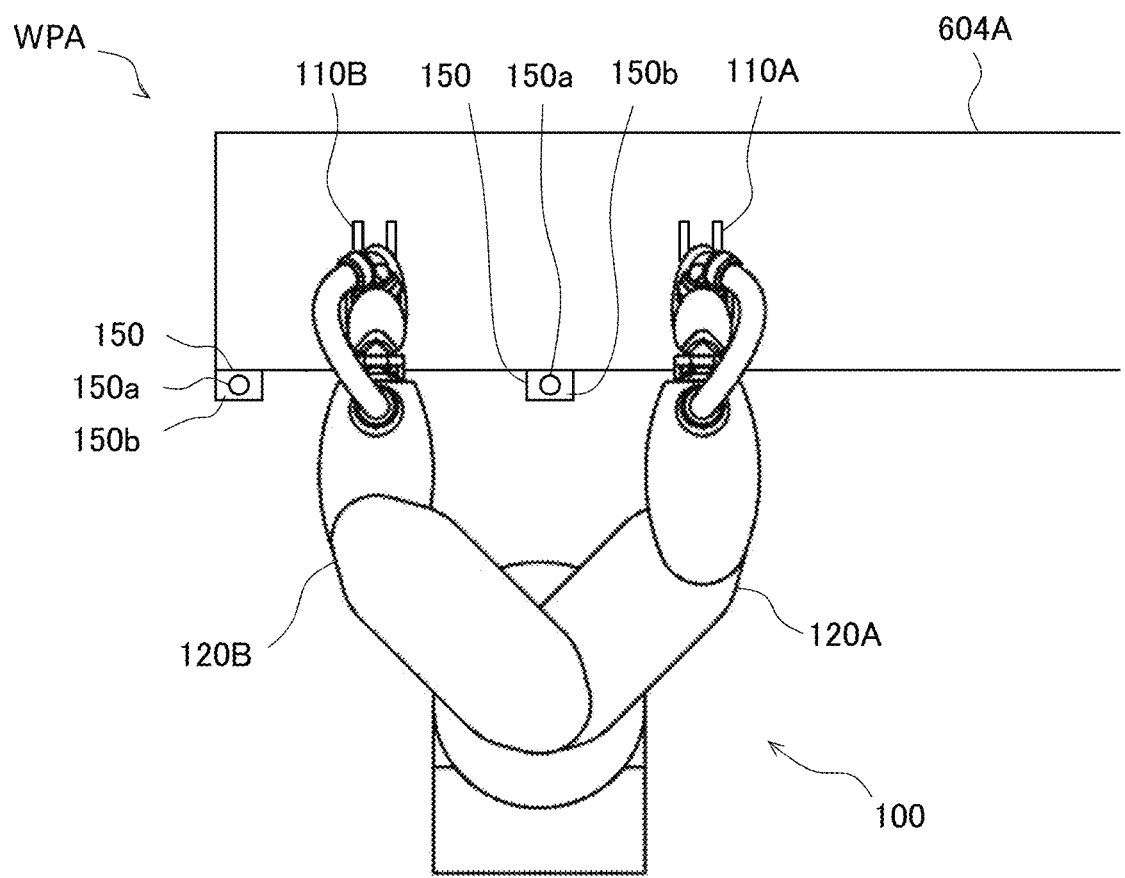
FIG. 4 is a plan view showing one example of members each including a detection hole.

FIG. 4 is a plan view showing one example of the members including the respective detection holes. As shown in FIG. 4, for example, in the workplace WPA, jigs 150 with the respective detection holes 150a formed therein may be disposed on the belt conveyer 604A. In FIG. 4, as a non-limiting example, each detection hole 150a has a cylindrical shape with a circular cross section. For example, the detection hole 150a may have any shape, so long as at least three arbitrary locations on the inner wall surface of the detection hole 150a are detectable and by using the detected three locations, for example, a reference position such as the center or the center axis of the detection hole 150a, or the sectional shape of the detection hole 150a, is detectable. For instance, the detection hole 150a may have a pillar-like shape with, for example, an ellipsoidal cross section, an oval cross section, or a polygonal cross section.

The jigs 150 may be disposed, in the workplace WPA, on each of components whose respective positions relative to the robot 100 need to be obtained, such as the belt conveyer 601A and the placement table 602A. In a case where the positions of the respective components relative to each other are known or detectable, the jigs 150 may be disposed on at least one of these components. At least two jigs 150, i.e., at least two detection holes 150a, are disposed in each of the workplace WPA and the workplace WPB. Each detection hole 150a is one example of a detection subject, and is one example of a recess.

As shown in FIG. 1, the imaging device 400 is disposed in each of the workplace WPA and the workplace WPB. In each of the workplace WPA and the workplace WPB, the imaging device 400 captures an image of at least part of the following components: the placement table 602A or 602B; and the belt conveyers 601A and 604A, or the belt conveyers 601B and 604B, positioned in the vicinity of the placement table 602A or 602B. In each of the workplace WPA and the workplace WPB, the imaging device 400 may be disposed on any of the components in the workplace. The imaging device 400 may be disposed on the robot 100. In the present embodiment, as a non-limiting example, the imaging device 400 includes a visible camera capable of capturing a digital moving image that is a visible image. For example, the imaging device 400 performs image capturing in accordance with a command from the controller 300, and transmits, for example, signals of a captured image to the controller 300.

The presentation device 500 presents, to a user P of the robot system 1, an image, voice, sound, etc., that are received from the controller 300 and that are intended for operating the robot system 1. Non-limiting examples of the presentation device 500 include a liquid crystal display and an organic or inorganic electro-luminescence display. The presentation device 500 may include a speaker that outputs voice and sound. For example, the presentation device 500 presents an image captured by the imaging device 400 to the user P operating the manipulation input device 200.

The manipulation input device 200 receives inputs of, for example, various information, data, and commands, and outputs the received information and so forth to the controller 300. For example, the manipulation input device 200 may include a known input means, such as a lever, a button, a touch panel, a joystick, or a motion capturer. For example, the manipulation input device 200 receives an input of manipulation performed on the robot 100 by the user P, and outputs manipulation information corresponding to the received manipulation to the controller 300. The manipulation input device 200 may receive the manipulation via the aforementioned input means, or may include an input means dedicated for receiving the manipulation.

Figure 5:
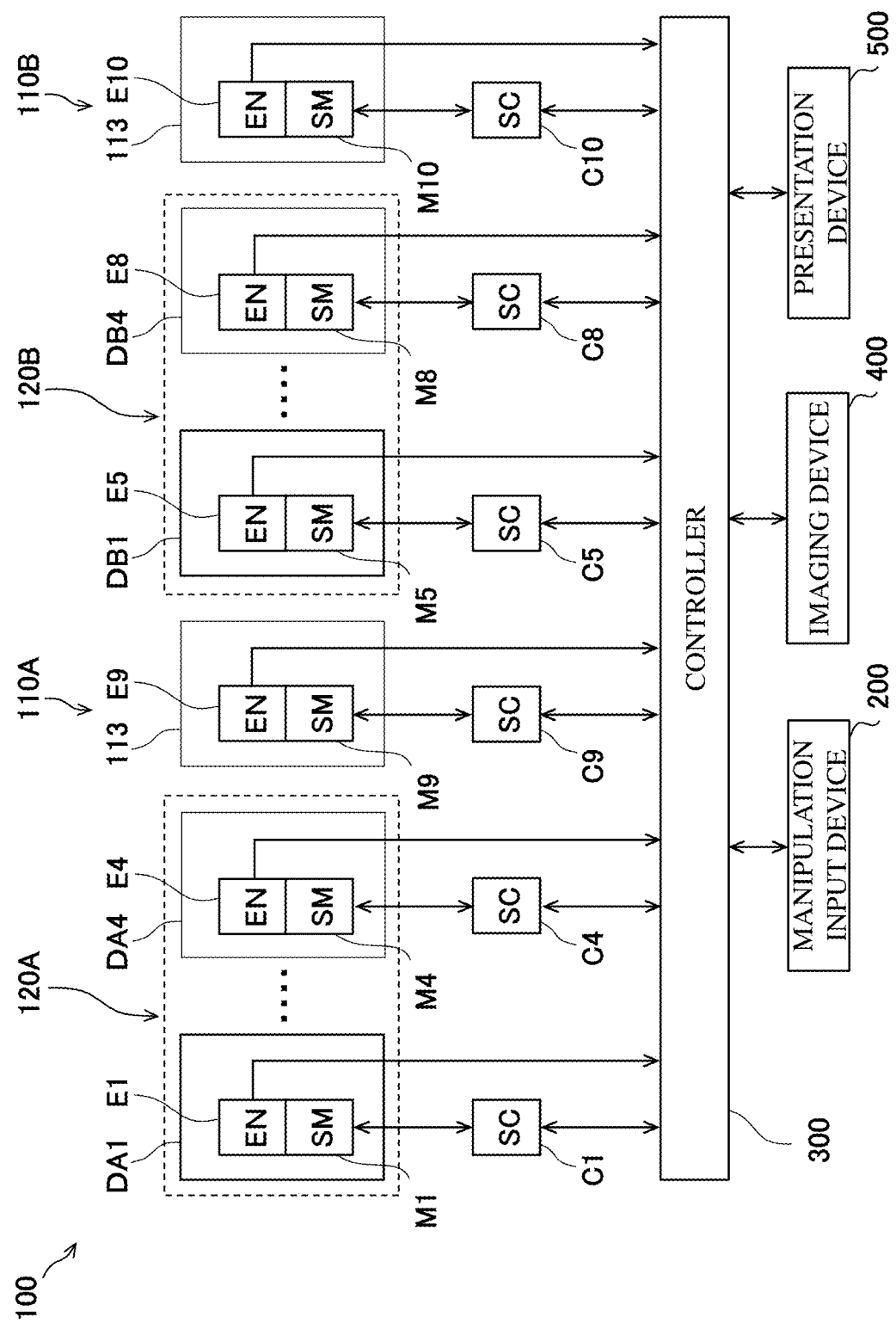
FIG. 5 is a block diagram showing one example of the configuration of a controller and its peripheral components according to the embodiment.

FIG. 5 is a block diagram showing one example of the configuration of the controller 300 and its peripheral components according to the embodiment. As shown in FIG. 5, the controller 300 is communicably connected to the robot 100, the manipulation input device 200, the imaging device 400, and the presentation device 500. The mode of communications adopted herein may be any communication mode among wired communications and wireless communications. The controller 300 operates the robot 100 in response to a command received by the manipulation input device 200. The controller 300 outputs, for example, an image captured by the imaging device 400 to the presentation device 500.

The controller 300 is electrically connected to servomotors M1 to M8 (referred to as "SM" in FIG. 5) of the drivers DA1 to DA4 and DB1 to DB4 of the arms 120A and 120B of the robot 100 via drive circuits C1 to C8 (referred to as "SC" in FIG. 5), respectively. The drive circuits C1 to C8 adjust current values of electric currents fed to the servomotors M1 to M8, respectively, in accordance with commands from the controller 300. The controller 300 is electrically connected to rotation sensors E1 to E8 (referred to as "EN" in FIG. 5), such as encoders, of the drivers DA1 to DA4 and DB1 to DB4. The controller 300 is electrically connected to servomotors M9 and M10 of the drivers 113 of the end effectors 110A and 110B via drive circuits C9 and C10, respectively. The drive circuits C9 and C10 adjust current values of electric currents fed to the servomotors M9 and M10, respectively, in accordance with commands from the controller 300. The controller 300 is electrically connected to rotation sensors E9 and E10 of the drivers 113 of the end effectors 110A and 110B. The rotation sensors E1 to E10 detect rotation amounts (e.g., rotation angles) of the servomotors M1 to M10, respectively, and output detection results to the controller 300.

The controller 300 includes an arithmetic unit including a processor, memories, and so forth. The arithmetic unit transmits and receives information, data, commands, etc., to and from other devices such as the manipulation input device 200. The arithmetic unit receives detection signals inputted from various sensors, and outputs control signals to controlled objects. The memories include storage devices, and examples of the storage devices include semiconductor memories such as volatile and nonvolatile memories, a hard disk, and an SSD (Solid State Drive). For example, the memories store therein, for example, programs executed by the arithmetic unit and various fixed data.

Functions of the arithmetic unit may be realized by a computer system (not shown) that includes, for example, a processor such as a CPU (Central Processing Unit), a volatile memory such as a RAM (Random Access Memory), and a nonvolatile memory such as a ROM (Read-Only Memory). The functions of the arithmetic unit may be partly or entirely realized as a result of the CPU executing a program stored in the ROM by using the RAM as a work area. The functions of the arithmetic unit may be partly or entirely realized by the aforementioned computer system, or may be partly or entirely realized by a dedicated hardware circuit such as an electronic circuit or an integrated circuit, or may be partly or entirely realized by a combination of the aforementioned computer system and hardware circuit.

The controller 300 may include, for example, a microcontroller, an MPU (Micro Processing Unit), an LSI (Large Scale Integration), a system LSI, a PLC (Programmable Logic Controller), or a logic circuit. Multiple functions of the controller 300 may be realized as multiple individual chips, respectively, or may be partly or entirely realized as a single chip. The aforementioned circuits may each be a general-purpose circuit or a dedicated circuit. As an LSI, for example, an FPGA (Field Programmable Gate Array), which can be programmed after LSI production, or a reconfigurable processor, which enables connections and/or settings of circuit cells in an LSI to be reconfigured, or an ASIC (Application Specific Integrated Circuit), in which multiple functionality circuits customized for a particular use are integrated as a single chip, may be used.

The controller 300 may be a single device that performs processes by centralized control, or may be multiple devices that perform distributed control in cooperation with each other, thereby performing the processes.

[Functional Configuration of Controller]

Figure 6:
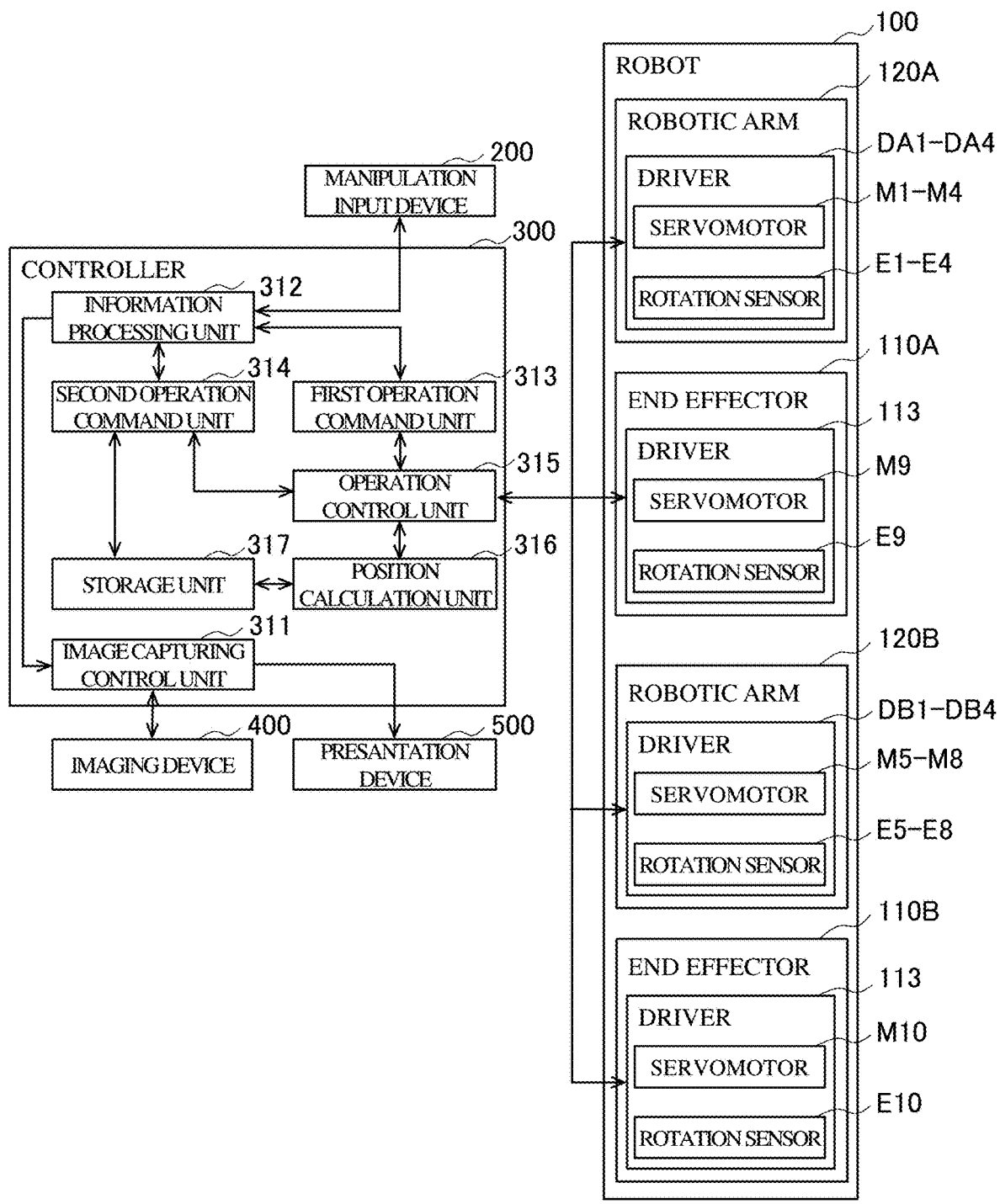
FIG. 6 is a block diagram showing one example of a functional configuration of the controller according to the embodiment.

FIG. 6 is a block diagram showing one example of the functional configuration of the controller 300 according to the embodiment. As shown in FIG. 6, the controller 300 includes the following functional components: an image capturing control unit 311; an information processing unit 312; operation command units 313 and 314; an operation control unit 315; a position calculation unit 316; and a storage unit 317. Functions of these functional components, except the storage unit 317, are realized by a computer system and/or a hardware circuit. The storage unit 317 is realized by memories. Not all of the above functional components are essential.

The information processing unit 312 receives various information, data, commands, etc., from the manipulation input device 200, and processes and outputs them to corresponding functional components. For example, the information processing unit 312 receives, from the manipulation input device 200, a command to cause the imaging device 400 to capture an image of the workplace WPA or WPB, and outputs the command to the image capturing control unit 311. The information processing unit 312 receives, from the manipulation input device 200, a command that specifies an operation mode of the robot 100, and outputs the received command to, for example, the operation command units 313 and 314.

For instance, examples of the operation mode include: an autonomous operation mode of causing the robot 100 to perform work by autonomous control; a manipulation-controlled operation mode of causing the robot 100 to perform work by manipulation control; and a detection mode of detecting the position of the robot 100. During the autonomous operation mode, part of the work performed by the robot 100 may be caused by manipulation control. The detection mode may include: a first detection mode in which all the operations performed by the robot 100 in this mode are caused by autonomous control; and a second detection mode in which the operations performed by the robot 100 in this mode are at least partly caused by manipulation control, and the remaining operations performed by the robot 100 in this mode are caused by autonomous control. For example, the work performed herein may be made up of multiple operations by the robot 100 for performing intended processes on a target object.

The image capturing control unit 311 receives a command from the information processing unit 312, and in accordance with the received command, causes the corresponding imaging device 400 to perform an image-capturing operation. The image capturing control unit 311 receives signals of a captured image from the imaging device 400, generates screen-displayable image data from the received signals, outputs the generated image data to the presentation device 500, and causes the presentation device 500 to display the image data.

The first operation command unit 313 functions in the manipulation-controlled operation mode and the second detection mode. The first operation command unit 313 generates, in accordance with manipulation information received from the manipulation input device 200, a manipulation-controlled operation command that is a command to operate the robot 100, and outputs the manipulation-controlled operation command to the operation control unit 315. Specifically, the manipulation-controlled operation command may include, for example, the following commands: commands to cause the arms 120A and 120B to move the positions and the postures of the end effectors 110A and 110B in accordance with the manipulation information; and commands to drive the drivers 113 of the end effectors 110A and 110B in accordance with the manipulation information. The manipulation-controlled operation command is a command for causing the end effectors 110A and 110B to perform operation corresponding to a manipulation that is inputted to the manipulation input device 200 by the user P.

An operation command herein includes at least either one of a position command or a force command, and in the present embodiment, includes a position command. The position command includes, among target values of, for example, a position, a posture, a positional velocity, and a posture velocity of a controlled object such as the end effector 110A or 110B, at least a target value of the position of the controlled object. The position and the positional velocity may indicate a position in a three-dimensional space (hereinafter, also referred to as "three-dimensional position") and a velocity in a three-dimensional space. The posture and the posture velocity may indicate a posture in a three-dimensional space (hereinafter, also referred to as "three-dimensional posture") and a velocity in a three-dimensional space. The position command may further include a time to execute the position command. The force command includes, among target values of a magnitude and a direction of a force applied by the controlled object, at least a target value of the magnitude of the force applied by the controlled object. The direction of the force may indicate a direction in a three-dimensional space. The force command may include a time to execute the force command. In the present specification and the claims, the term "position" is defined to include the meaning of, among a position, a positional velocity, a posture, and a posture velocity in a three-dimensional space, at least a position in a three-dimensional space.

The second operation command unit 314 functions in the autonomous operation mode and the first detection mode. The second operation command unit 314 generates, in accordance with autonomous operation information stored in the storage unit 317, an autonomous operation command that is a command to operate the robot 100, and outputs the autonomous operation command to the operation control unit 315. The autonomous operation command is a command for causing the end effectors 110A and 110B to perform operation corresponding to preset autonomous operation information. To generate the autonomous operation command, the second operation command unit 314 uses information, stored in the storage unit 317, about the position and the posture of the robot 100 in relation to a workplace and/or information, stored in the storage unit 317, about the position and the posture of the robot 100 in relation to components of the workplace. The posture may be the orientation of the robot 100 in the horizontal direction, i.e., the azimuth of the robot 100.

For example, the autonomous operation information may include information about operation details and the order of operations by the end effectors 110A and 110B, and for causing the end effectors 110A and 110B to operate in accordance with the operation details and the order of operations, the autonomous operation information may include information about operation details and the order of operations by the drivers DA1 to DA4 and DB1 to DB4 of the arms 120A and 120B and the drivers 113 of the end effectors 110A and 110B. For example, the autonomous operation information may include each position, each posture, each position moving velocity, and each posture moving velocity of each of the end effectors 110A and 110B. The autonomous operation information may include an order in which, for example, each position of each of the end effectors 110A and 110B, each posture of each of the end effectors 110A and 110B and each operation of the driver 113 of each of the end effectors 110A and 110B are to be performed. The autonomous operation information may include times at which, for example, each position of each of the end effectors 110A and 110B, each posture of each of the end effectors 110A and 110B and each operation of the driver 113 of each of the end effectors 110A and 110B are to be performed.

For example, the autonomous operation information corresponding to the autonomous operation mode may be teaching data. The autonomous operation information corresponding to the first detection mode may be data similar to teaching data, and may be data preset by programming.

The operation control unit 315 determines, in accordance with the manipulation-controlled operation command or the autonomous operation command received from the operation command unit 313 or 314, current values of electric currents that are fed to the servomotors M1 to M10 of the robot 100 to drive the servomotors M1 to M10, thereby controlling the feeding of the electric currents. In this control, the operation control unit 315 may use detection values of, for example, the rotation sensors E1 to E10 and current sensors (not shown) of the servomotors M1 to M10 as feedback information. Alternatively, the operation control unit 315 may use, as feedback information, command values of the electric currents that are fed to the servomotors M1 to M10 by the drive circuits C1 to C10. The operation control unit 315 thus configured performs servo control. Consequently, the arms 120A and 120B cause the end effectors 110A and 110B to perform operation corresponding to manipulation information or autonomous operation information. The current sensors detect the current values of the electric currents fed to the servomotors M1 to M10, and output the detection results to the controller 300.

The position calculation unit 316 functions in the first and second detection modes. In each detection mode, the position calculation unit 316 detects at least either one of the position of the robot 100 in the horizontal direction or the position of the robot 100 in the vertical direction. For example, in the case of detecting the position of the robot 100 in the horizontal direction, the robot 100 inserts, from above, the insert 140 of the end effector 110A or 110B into each of the detection holes 150a of the two jigs 150, and moves the insert 140 in the horizontal direction to bring the insert 140 into contact with at least three locations on the inner wall surface of each detection hole 150a. The position calculation unit 316 detects the position of the insert 140 in relation to the robot 100 when the insert 140 comes into contact with the inner wall surface. Specifically, the position calculation unit 316 detects the position of the insert 140 in relation to the robot 100 based on driving amounts of the joints JA1 to JA4 of the arm 120A, or driving amounts of the joints JB1 to JB4 of the arm 120B, which inserts the insert 140 in each detection hole 150a, i.e., based on detection values of the rotation sensors E1 to E4 or detection values of the rotation sensors E5 to E8. The position in relation to the robot 100 may be a position in relation to a fixed reference position on the robot 100, such as a point of intersection between the first axis S1 and the top surface of the base 130.

For each detection hole 150a, the position calculation unit 316 detects the position of the detection hole 150a in the horizontal direction in relation to the robot 100 by using the positions of the insert 140 therein at the three respective contact locations. At the time, the position calculation unit 316 uses information about the detection hole 150a, the information being stored in the storage unit 317. The information about the detection hole 150a includes the sectional shape and dimensions of the detection hole 150a. Further, the position calculation unit 316 uses information about the position of the insert 140 in relation to the robot 100 and at least the sectional shape information from the information about the detection hole 150a to detect the center axis of a circular cylinder, the circular cylinder passing through the center axis of the insert 140 at each of the three contact locations and having a horizontal cross section with the aforementioned sectional shape. Then, the position calculation unit 316 determines the position of the detected center axis of the circular cylinder in the horizontal direction as the position of the detection hole 150a in the horizontal direction.

Further, the position calculation unit 316 uses the information about the position of each of the two detection holes 150a in the horizontal direction in relation to the robot 100 and information, stored in the storage unit 317, about the position of each detection hole 150a in relation to a component of the workplace in which the jigs 150 are disposed to detect the position and the posture of the robot 100 in the horizontal direction in relation to the component. The posture of the robot 100 in the horizontal direction may be the orientation of the robot 100 in the horizontal direction (i.e., azimuth). The position calculation unit 316 may detect the position and the posture of the robot 100 in the horizontal direction in relation to at least one of the components of the workplace, or may detect the positions and the postures of the robot 100 in the horizontal direction in relation to all the components of the workplace. For example, in a case where at least two jigs 150 are disposed on each of all the components, the position calculation unit 316 may detect the position and the posture of the robot 100 in the horizontal direction in relation to each component. In a case where the positional relationship among the components is known, the position calculation unit 316 may detect the position and the posture of the robot 100 in the horizontal direction in relation to one of the components. Further, the position calculation unit 316 may detect the position and the posture of the robot 100 in the horizontal direction in relation to the workplace by using information, stored in the storage unit 317, about the position of each of the components in the workplace. The position calculation unit 316 stores the detected position(s) and posture(s) of the robot 100 in the horizontal direction in the storage unit 317.

In the workplace, the jigs 150 each including the detection hole 150a and the robot 100 are disposed. The aforementioned component of the workplace is a component on which the jigs 150 are disposed, for example, a belt conveyer. The position of the detection hole 150a in relation to the component may be the position of the jig 150 in relation to the component. The workplace itself may be seen as the component, and the position of the detection hole 150a in relation to the component may be the position of the detection hole 150a in relation to the workplace.

In the detection of the position of the robot 100 in the vertical direction, the robot 100 brings the insert 140 of the end effector 110A or 110B into contact with, from above, at least one location on a top surface 150b (see FIG. 4) around the detection hole 150a of one jig 150. The position calculation unit 316 detects the position of the insert 140 in relation to the robot 100 when the insert 140 comes into contact with the top surface 150b. The position calculation unit 316 uses the detected position of the insert 140 to detect the position of the top-end opening of the detection hole 150a in the vertical direction in relation to the robot 100. At the time, the position calculation unit 316 uses information, stored in the storage unit 317, about the jig 150 and the detection hole 150a.

Further, the position calculation unit 316 uses the information about the position of the top-end opening of the detection hole 150a in the vertical direction in relation to the robot 100 and information, stored in the storage unit 317, about the position of the detection hole 150a in relation to a component of the workplace in which the jig 150 is disposed to detect the position of the robot 100 in the vertical direction in relation to the component. The position calculation unit 316 may detect the position of the robot 100 in the vertical direction in relation to at least one of the components of the workplace, or may detect the positions of the robot 100 in the vertical direction in relation to all the components of the workplace. Further, the position calculation unit 316 may detect the position of the robot 100 in the vertical direction in relation to the workplace by using information, stored in the storage unit 317, about the position of each of the components in the workplace. The position calculation unit 316 stores the detected position(s) of the robot 100 in the vertical direction in the storage unit 317.

The storage unit 317 can store various information therein, and allows the stored information to be read out therefrom. For example, the storage unit 317 may store autonomous operation information about the robot 100, information about the inserts 140 of the robot 100, information about the jigs 150, information about the detection holes 150a, etc. The storage unit 317 may also store, for example, information about the position of each component in each workplace and information about the positions of the respective components relative to each other. The storage unit 317 may also store, for example, design values or target values of the position and the posture of the robot 100 in relation to each component in each workplace. The storage unit 317 may also store programs for realizing the functions of the controller 300. For example, both a program for performing the first detection mode and a program for performing the second detection mode are created for each of the workplaces such as the workplace WPA and the workplace WPB, or created for each component, and stored in the storage unit 317. For example, the above information and so forth may be stored in the storage unit 317 in advance, or may be stored in the storage unit 317 through inputs using the manipulation input device 200.

The information about the inserts 140 may include, for example, the following information: the position of one insert 140 in relation to the interfacing surface of the link 124A of the arm 120A and the position of the other insert 140 in relation to the interfacing surface of the link 124B of the arm 120B; the directions in which the respective inserts 140 extend; and the shapes and dimensions of the inserts 140. The information about the jigs 150 may include, for example, the following information: the positions of the respective jigs 150 in relation to the workplace; the positions of the respective jigs 150 in relation to a component on which the jigs 150 are disposed; the shapes and dimensions of the jigs 150; and the number of detection holes 150a, the positions of the respective detection holes 150a, and the directions in which the respective detection holes 150a extend, in the jigs 150. The information about the detection holes 150a may include, for example, the sectional shapes and dimensions of the detection holes 150a.

[Operations of Robot System]

Figure 7:
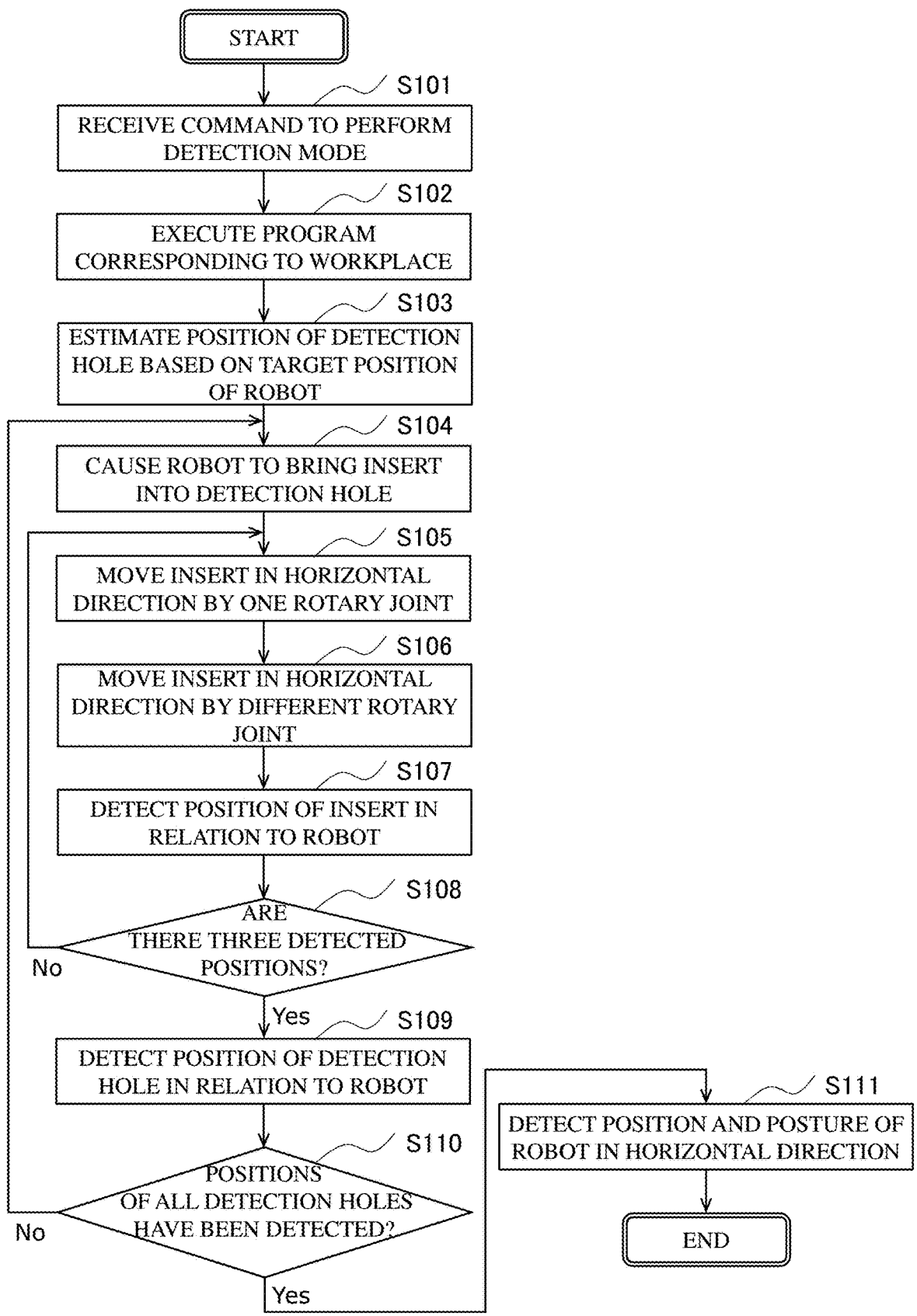
FIG. 7 is a flowchart showing one example of operations of the robot system according to the embodiment.

Hereinafter, operations of the robot system 1 according to the embodiment are described. Specifically, operations performed in the first detection mode are described. FIG. 7 is a flowchart showing one example of operations of the robot system 1 according to the embodiment. FIG. 7 shows the case of detecting the position of the robot 100 in the horizontal direction.

As shown in FIG. 7, in step S101, a user P inputs, into the manipulation input device 200 of the robot system 1, a command to detect the position of the robot 100 in the horizontal direction in the first detection mode and information about a workplace in which the robot 100 is disposed. The controller 300 receives the command and the information. In this example, information about the workplace WPA is inputted.

For example, in a case where the robot 100 has been moved from the workplace WPA to the workplace WPB, or from the workplace WPB to the workplace WPA, for the purpose of, for example, set-up change, the user P performs a detection mode to cause the controller 300 to store a precise position of the robot 100. Regardless of whether the robot 100 has been moved manually or has been moved by a transporter such as AGV, the position at which the robot 100 is disposed has discrepancies from a target position in terms of distance and direction. The controller 300 incorporates the discrepancies into the target position.

Then, in step S102, the controller 300 reads out, from the storage unit 317, a program for the first detection mode corresponding to the workplace WPA, and executes the program.

Next, in step S103, the controller 300 reads out, from the storage unit 317, information about a target position at which the robot 100 is to be disposed in the workplace WPA, information about the two jigs 150 in the workplace WPA, and information about the detection holes 150a. In this example, as shown in FIG. 4, the two jigs 150 are disposed on the belt conveyer 604A. Based on these information, the controller 300 detects a target position of the robot 100 in relation to each of the detection holes 150a. Based on the detected target position, the controller 300 estimates the position of each detection hole 150a.

Then, in step S104, based on the estimated positions, the controller 300 operates the robot 100 to insert one of the inserts 140, from above, into one of the two detection holes 150a whose position has not been detected yet. Specifically, in the detection hole 150a, the robot 100 positions the insert 140 laterally in the horizontal direction in relation to the detection hole 150a. In this example, the controller 300 inserts the insert 140 of the arm 120B into the detection hole 150a.

Next, in step S105, the controller 300 operates the rotary joint JB1 of the arm 120B to move the insert 140 inside the detection hole 150a in the horizontal direction, i.e., laterally in relation to the detection hole 150a. At the time, the controller 300 sets the gain of the servomotor M5 of the driver DB1 of the rotary joint JB1 to be relatively low to make the rise and response of the rotational torque gradual. For example, the gain of the servomotor M5 may be such a gain that the servomotor M5 can rotate the link 121B together with a part of the arm 120B, the part extending from the link 121B to the distal end side.

Further, the controller 300 sets the gain of the servomotor of the driver of a different rotary joint from the rotary joint JB1 to be lower than the gain of the servomotor M5. Specifically, the controller 300 sets the gain of the servomotor M6 of the driver DB2 of the rotary joint JB2 to be lower than the gain of the servomotor M5. The gain of the servomotor M6 may be such a gain that while the link 121B is being rotated, the state of the rotary joint JB2 is maintained and the rotary joint JB2 is not rotated. For example, the gain of the servomotor M6 may be such a gain that while the link 121B is rotating, if a part of the arm 120B, the part extending from the link 122B to the distal end side, comes into contact with another physical object, the servomotor M6 is pushed back and consequently allows rotation of the rotary joint JB2.

Figure 8:
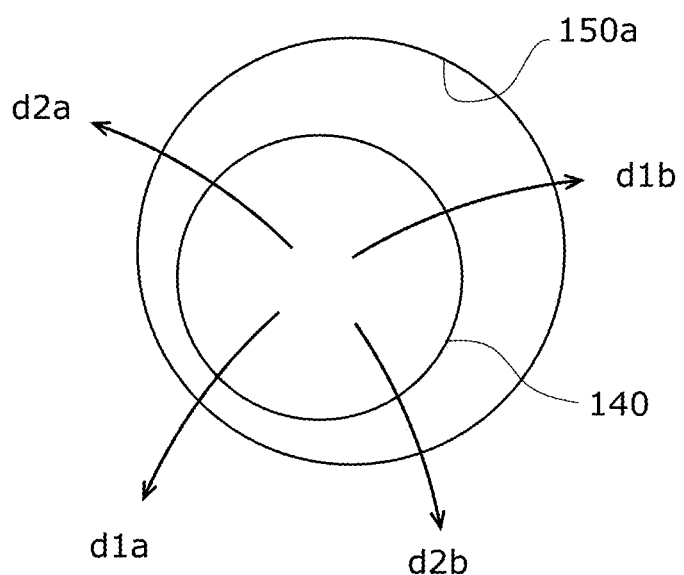
FIG. 8 is a plan view showing one example of an operation of moving an insert inside the detection hole according to the embodiment.

FIG. 8 is a plan view showing one example of an operation of moving the insert 140 inside the detection hole 150a according to the embodiment. As shown in FIG. 8, the controller 300 causes the rotary joint JB1 to rotate in its both rotational directions d1a and d1b, and when a contact between the insert 140 and the inner wall surface of the detection hole 150a is detected, stops the rotary joint JB1 from rotating. The controller 300 may determine the presence or absence of the contact based on deviations of detection values of the rotation sensor E1 of the driver DB1 and deviations of detection values of a current sensor (not shown) of the driver DB1. While the driver DB1 is applying driving force to rotate the link 121B and the driver DB2 is applying driving force to cause the link 122B to maintain its state, the insert 140 comes into contact with the inner wall surface of the detection hole 150a. Accordingly, when the insert 140 comes into contact with the inner wall surface, and immediately after the insert 140 comes into contact with the inner wall surface, movements of the links 121B and 122B due to rattling (e.g., backlash) at the rotary joints JB1 and JB2 are suppressed.

Next, in step S106, the controller 300 operates the rotary joint JB2, which is a different rotary joint of the arm 120B from the rotary joint JB1, to move the insert 140 inside the detection hole 150a in the horizontal direction, i.e., laterally in relation to the detection hole 150a. At the time, similar to the case of the servomotor M5 in step S105, the controller 300 sets the gain of the servomotor M6 of the driver DB2 to be relatively low. Further, similar to the case of the servomotor M6 in step S105, the controller 300 sets the gain of the servomotor M5 of the driver DB1 of the rotary joint JB1, which is a different rotary joint from the rotary joint JB2, to be lower than the gain of the servomotor M6. As shown in FIG. 8, the controller 300 causes the rotary joint JB2 to rotate in its both rotational directions d2a and d2b, and when a contact between the insert 140 and the inner wall surface of the detection hole 150a is detected, stops the rotary joint JB2 from rotating.

For example, in step S105, it is possible that, before the insert 140 comes into contact with the inner wall surface, the rotary joint JB1 continues rotating for a certain period of time, and thereby the torque of the servomotor M5 rises. In this case, it is possible that the insert 140 bounces off the inner wall surface of the detection hole 150a. In step S106, in a state where the insert 140 has come close to the inner wall surface of the detection hole 150a, the rotary joint JB2 starts rotating. For this reason, the rise of the torque of the servomotor M6 before the insert 140 comes into contact with the inner wall surface is low. Further, the direction in which the insert 140 is moved by the rotary joint JB2 is different from, e.g., crosses, the direction in which the insert 140 is moved by the rotary joint JB1. Accordingly, when a contact between the insert 140 and the inner wall surface of the detection hole 150a is detected, the rotation of the rotary joint JB2 can be stopped in a state where the insert 140 is in contact with the inner wall surface. Consequently, the position of the insert 140 in the horizontal direction can be made corresponding to the position of the inner wall surface in the horizontal direction. The order of these steps S105 and S106 may be reversed.

Figure 9:
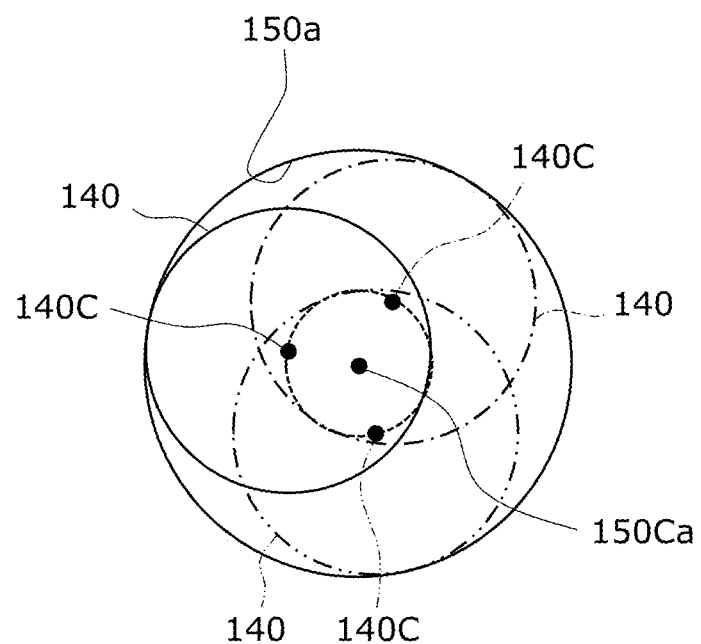
FIG. 9 is a plan view showing one example of three contact states, in each of which the insert is in contact with the detection hole, according to the embodiment.

Next, in step S107, the controller 300 detects the position of the insert 140 in relation to the robot 100 when the insert 140 has come into contact with the inner wall surface of the detection hole 150a. That is, the controller 300 detects the position of the insert 140 in relation to the robot 100 when the rotation of the rotary joint JB2 is stopped. Specifically, the position calculation unit 316 detects the position and the posture of the interfacing surface of the end effector 110B from detection values of the rotation sensors E5 to E8 of the arm 120B. The position calculation unit 316 detects, for example, as shown in FIG. 9, the position of the center axis 140C of the insert 140 in relation to the robot 100 based on the information about the position and the posture of the interfacing surface and information, stored in the storage unit 317, about the insert 140. In steps S105 and S106, only the rotary joint JB1 or JB2 is rotated. Therefore, calculations performed for the above detection are simple. FIG. 9 is a plan view showing one example of three contact states, in each of which the insert 140 is in contact with the detection hole 150a, according to the embodiment.

Next, in step S108, the controller 300 determines whether or not the number of detected positions of the insert 140 is three. In a case where the number of detected positions of the insert 140 is three (Yes in step S108), the flow proceeds to step S109. In a case where the number of detected positions of the insert 140 is less than three (No in step S108), the controller 300 performs steps S105 to S107 again.

In step S109, the controller 300 detects the position of the detection hole 150a in the horizontal direction in relation to the robot 100 by using the information about the three positions of the insert 140 in relation to the robot 100 and information, stored in the storage unit 317, about the detection hole 150a. Specifically, as shown in FIG. 9, the position of the center axis 150Ca of the detection hole 150a in the horizontal direction is detected as the position of the center axis of a circular cylinder in the horizontal direction, the circular cylinder passing through the three positions of the center axis 140C of the insert 140.

Next, in step S110, the controller 300 determines whether or not the positions of all the detection holes 150a in the horizontal direction in relation to the robot 100 have been detected. In a case where the positions of all the detection holes 150a in the horizontal direction in relation to the robot 100 have been detected (Yes in step S110), the flow proceeds to step S111. In a case where the positions of all the detection holes 150a in the horizontal direction in relation to the robot 100 have not been detected yet (No in step S110), the flow returns to step S104, and the controller 300 performs the process in step S104 and the following processes again for the detection hole 150a whose position in the horizontal direction in relation to the robot 100 has not been detected. In this example, the same arm 120B and the same insert 140 are used for all the detection holes 150a. This makes it possible to reduce discrepancies in detection results that are caused by, for example, differences in characteristics and performance between the arm 120A and the arm 120B.

In step S111, the controller 300 detects the position and the posture of the robot 100 in the horizontal direction in relation to the two detection holes 150a by using the information about the positions of the two detection holes 150a in the horizontal direction in relation to the robot 100. Based on the detection results, the controller 300 may detect the position and the posture of the robot 100 in the horizontal direction in relation to the belt conveyer 604A and/or the workplace WPA. The controller 300 stores the detection results in the storage unit 317.

By performing the processes in steps S101 to S111, the controller 300 can detect the position and the posture of the robot 100 in the horizontal direction in relation to the workplace WPA and/or a component(s) of the workplace WPA. If two or more jigs 150 are disposed on each of the components of the workplace WPA, the controller 300 can detect the position and the posture of the robot 100 in the horizontal direction in relation to each of these components. The processes in steps S101 to S111 may be performed by using the arm 120A. In the processes in steps S101 to S111, processes for one detection hole 150a may be performed by using the arm 120A, whereas processes for another detection hole 150a may be performed by using the arm 120B. The position of one detection hole 150a in the horizontal direction may be detected by using the positions of the insert 140 at four or more contact locations where the insert 140 contacts the detection hole 150a. The processes in steps S104 to S110 may be performed for three or more detection holes 150a, and the positions of the three or more detection holes 150a in the horizontal direction may be used to detect the position and the posture of the robot 100.

In the second detection mode, the controller 300 performs processes in the same manner as in the first detection mode. However, alternatively, in step S104, the controller 300 may cause the robot 100 to operate by manipulation control in accordance with manipulation information outputted from the manipulation input device 200 corresponding to manipulation inputs by the user P, and the controller 300 may eliminate the processes in steps S102 and S103. A program executed by the controller 300 in the second detection mode need not be a program corresponding to the workplace.

Figure 10:
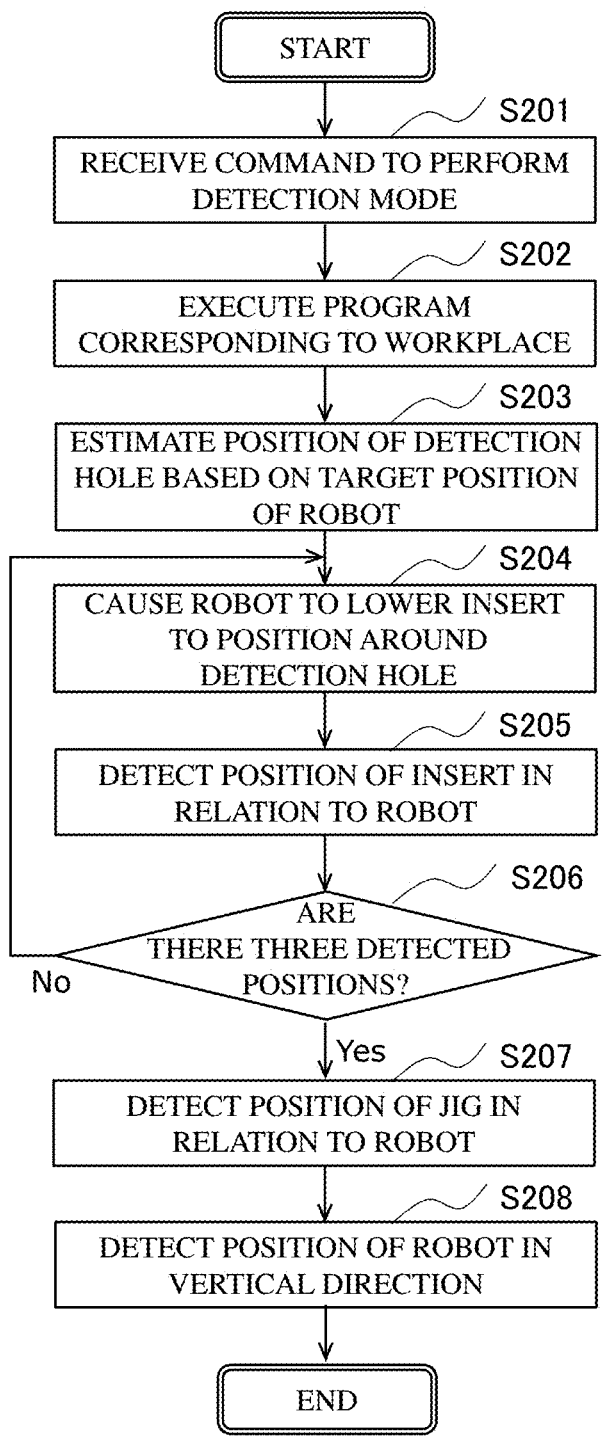
FIG. 10 is a flowchart showing another example of operations of the robot system according to the embodiment.

FIG. 10 is a flowchart showing another example of operations of the robot system 1 according to the embodiment. FIG. 10 shows the case of detecting the position of the robot 100 in the vertical direction. As shown in FIG. 10, in step S201, the user P inputs, into the manipulation input device 200, a command to detect the position of the robot 100 in the vertical direction in the first detection mode and information about the workplace WPA in which the robot 100 is disposed. The controller 300 receives the command and the information.

The processes in steps S202 and S203 are the same as those in steps S102 and S103. The number of detection holes 150a used in the detection of the position of the robot 100 in the vertical direction may be at least one. In this example, the number of detection holes 150a used in the detection is one.

Next, in step S204, based on an estimated position of the detection hole 150a, the controller 300 operates the arm 120B of the robot 100 to move the insert 140 to a position above the top surface 150b of the jig 150 around the top-end opening of the detection hole 150a. Next, the controller 300 operates the linear-motion joint JB3 to lower the insert 140 from the position above the top surface 150b onto the top surface 150b. In this example, the controller 300 moves the insert 140 of the arm 120B. When a contact between the insert 140 and the top surface 150b of the jig 150 is detected, the controller 300 stops lowering the linear-motion joint JB3.

At the time of lowing the linear-motion joint JB3, the controller 300 sets the gain of the servomotor M7 of the driver DB3 to be relatively low. For example, the gain of the servomotor M7 may be about the same as the gain of the servomotor M5 of the rotary joint JB1 in step S105 of FIG. 7. For example, the gain of the servomotor M7 may be such a gain that when the lowered link 123B or end effector 110B comes into contact with another physical object, the servomotor M7 stops rotating.

Next, in step S205, the controller 300 detects the position of the insert 140 in relation to the robot 100 when the insert 140 has come into contact with the top surface 150b of the jig 150. The controller 300 detects the position of the insert 140 in relation to the robot 100 when the lowering of the linear-motion joint JB3 is stopped.

Next, in step S206, the controller 300 determines whether or not the number of detected positions of the insert 140 is three. In a case where the number of detected positions of the insert 140 is three (Yes in step S206), the flow proceeds to step S207. In a case where the number of detected positions of the insert 140 is less than three (No in step S206), the controller 300 performs steps S204 and S205 again.

In step S207, based on the three positions of the insert 140 in relation to the robot 100, the controller 300 detects the position of the top surface 150b of the jig 150 in the vertical direction in relation to the robot 100. For example, by averaging the three positions of the insert 140, the controller 300 may detect the position of the top surface 150b in the vertical direction. The position of the top surface 150b in the vertical direction corresponds to the position of the top-end opening of the detection hole 150a in the vertical direction.

Next, in step S208, the controller 300 uses the information about the position of the top-end opening of the detection hole 150a in the vertical direction in relation to the robot 100 and information, stored in the storage unit 317, about the jig 150 and the belt conveyer 604A to detect the position of the robot 100 in the vertical direction in relation to the belt conveyer 604A. Further, the controller 300 may detect the position of the robot 100 in the vertical direction in relation to the workplace WPA. The controller 300 stores the detection results in the storage unit 317.

By performing the processes in steps S201 to S208, the controller 300 can detect the position of the robot 100 in the vertical direction in relation to the workplace WPA and/or a component(s) of the workplace WPA. If the jig 150 is disposed on each of the components of the workplace WPA, the controller 300 can detect the position of the robot 100 in the vertical direction in relation to each of these components. The processes in steps S201 to S208 may be performed by using the arm 120A. The position of the top-end opening of one detection hole 150a in the vertical direction may be detected by using the position(s) of the insert 140 at one, two, or four or more contact locations where the insert 140 contacts the surrounding of the detection hole 150*a*. The processes in steps S204 to S207 may be performed for two or more detection holes 150*a*, and the positions of the respective two or more detection holes 150*a* in the vertical direction may be used to detect the position of the robot 100 in the vertical direction.

In the second detection mode, the controller 300 performs processes in the same manner as in the first detection mode. However, alternatively, in step S204, the controller 300 may cause the robot 100 to operate by manipulation control in accordance with manipulation information outputted from the manipulation input device 200 corresponding to manipulation inputs by the user P, and the controller 300 may eliminate the processes in steps S202 and S203.

Other Embodiments

Although the examples of the embodiment of the present disclosure have been described as above, the present disclosure is not limited to the above-described embodiment. That is, various modifications and improvements can be made within the scope of the present disclosure. For example, modes obtained by implementing various modifications on the above-described embodiment, and modes constructed by combining the components of different embodiments also fall within the scope of the present disclosure.

For example, in the above-described embodiment, in the first and second detection modes, the controller 300 may cause the robot 100 to perform an operation of indicating a type of control that is currently being performed among multiple types of control corresponding to respective comparison objects whose positions are to be compared with the position of the robot 100, i.e., the controller 300 may cause the robot 100 to perform an operation of indicating a current comparison object. For instance, examples of the comparison objects include the workplaces WPA and WPB and components disposed in the workplaces WPA and WPB, such as the belt conveyers and the placement tables.

The controller 300 may indicate types of respective comparison objects by utilizing the order of detection holes 150*a*, in each of which the insert 140 is to be inserted by the robot 100. Alternatively, at least one additional detection hole 150*a* that is not to be used for detecting the position of the robot 100 may be included among the detection holes 150*a*. A detection mode program may be set for each comparison objects. In each detection mode program, for instance, the comparison object may be associated with the following information: the presence or absence of an operation of the robot 100 inserting the insert 140 into the additional detection hole 150*a*; the number of additional detection holes 150*a* of the comparison object, in each of which the insert 140 is to be inserted; and the order of the insertion of the insert 140 into each additional detection hole 150*a* among the order of insertions of the insert 140 into all the detection holes 150*a*, and the like. This allows the user P to recognize a currently executed program and/or a comparison object corresponding to the currently executed program by looking at the operation of the robot 100, and thereby to determine whether a proper program is being executed. This makes it possible to suppress erroneous detection of the position of the robot 100.

The robot system 1 according to the above-described embodiment is used for detecting the position of the robot 100 when the robot 100 is moved. However, this is a non-limiting example. The robot system 1 may be used in any case in which the robot 100 is disposed at a predetermined position. The robot system 1 may be used in any case in which the positions of a target object and the robot 100 relative to each other need to be detected.

In the above-described embodiment, the inserts 140, which are downward projections from the respective end effectors 110A and 110B, are described as one example of the contacting structures of the respective arms 120A and 120B. Also, the detection holes 150*a*, which are recesses in the respective jigs 150 disposed in a workplace, are described as one example of the detection subjects. However, these are non-limiting examples. For example, the contacting structures need not be separated from, but may be integrated with, the end effectors 110A and 110B or the links 124A and 124B of the arms 120A and 120B. The detection subjects need not be separated from, but may be integrated with, a component of the workplace, such as a belt conveyer.

For example, each contacting structure may be a recess, and each detection subject may be a projection. In this case, the arm 120A and/or the arm 120B may include a member including a recess such as a hole, and a member such as the jig 150 that includes a projection such as a shaft may be disposed in the workplace. For example, in the case of detecting the position of the robot 100 in the horizontal direction, the controller 300 may cause the arm 120A or 120B to insert the projection, which projects upward, into the recess, which faces downward, and to move the recess laterally to bring at least three locations on the inner wall surface of the recess into contact with the projection. In the case of detecting the position of the robot 100 in the vertical direction, the controller 300 may cause the arm 120A or 120B to move the recess downward to bring at least one location on a surface around the recess into contact with the projection.

Figure 11:
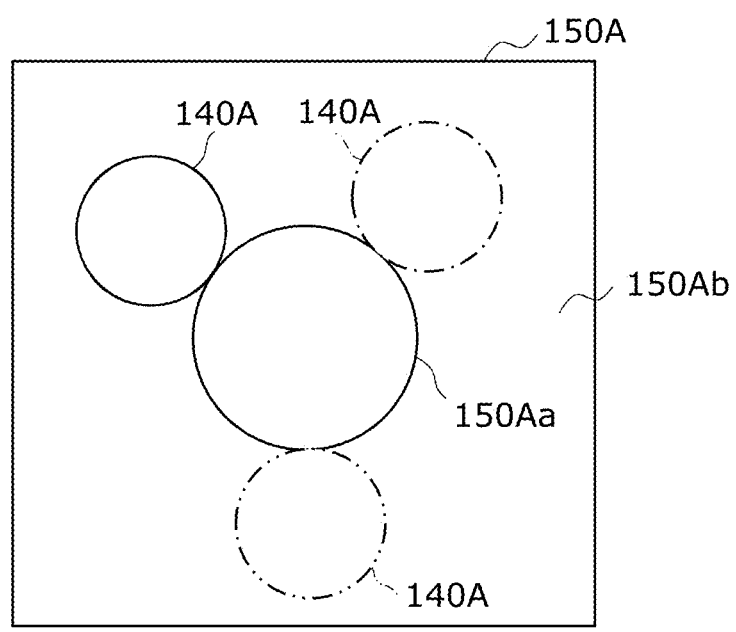
FIG. 11 is a plan view showing one example of contact states, in each of which a contacting structure is in contact with a detection subject according to one variation of the embodiment.

Alternatively, each contacting structure may be a projection, and each detection subject may also be a projection. The arm 120A and/or the arm 120B may include a member including a projection such as the insert 140, and a member such as the jig 150 that includes a projection such as a shaft may be disposed in the workplace. In the case of detecting the position of the robot 100 in the horizontal direction, for example, as shown in FIG. 11, the controller 300 may cause the arm 120A or 120B to move a contacting structure 140A laterally, the contacting structure 140A having a columnar shape and projecting downward, such that the contacting structure 140A comes into contact with at least three locations on an outer peripheral surface of a detection subject 150Aa of a jig 150A, the detection subject 150Aa having a columnar shape and projecting upward. In the case of detecting the position of the robot 100 in the vertical direction, the controller 300 may cause the arm 120A or 120B to move the contacting structure 140A downward, such that the contacting structure 140A comes into contact with at least one location on a top surface 150Ab of the jig 150A around the detection subject 150Aa. FIG. 11 is a plan view showing one example of contact states, in each of which the contacting structure 140A is in contact with the detection subject 150Aa according to one variation of the embodiment.

In the above-described embodiment, the industrial robot 100 is described as one example of a mechanical apparatus to which the technique of the present disclosure is applicable. However, alternatively, the technique of the present disclosure may be applied to a mechanical apparatus different from an industrial robot. For example, the mechanical apparatus to which the technique of the present disclosure is applied may be a service robot, humanoid, or the like. The service robot is a robot for use in various services, such as nursing care, medical care, cleaning, security guarding, guiding, rescuing, cooking, product offering, etc.

The technique of the present disclosure may be a position detection method. For example, a position detection method according to one aspect of the present disclosure is a position detection method of detecting a position of a robot in relation to a target object, the robot including an arm. The method includes: (a) causing the arm, on which a contacting structure is disposed, to position the contacting structure laterally in a horizontal direction in relation to a first detection subject that is one of at least two detection subjects disposed on the target object; (b) causing the arm to move the contacting structure laterally to bring the contacting structure into contact with at least three locations on a surface of the first detection subject; (c) detecting positions of the contacting structure in relation to the robot when the contacting structure comes into contact with the at least three locations, respectively; (d) detecting a position of the first detection subject in relation to the robot by using the detected at least three positions of the contacting structure; (e) performing same steps as the steps (a) to (d) for another detection subject, different from the first detection subject, of the at least two detection subjects; and (f) detecting the position of the robot in relation to the target object by using the positions of the at least two detection subjects in relation to the robot and using positions of the at least two detection subjects in relation to the target object. The position detection method may be realized by, for example, a CPU, a circuit such as an LSI, an IC card, or a single module.

The technique of the present disclosure may be a program to be executed for performing the above position detection method, or may be a non-transitory computer-readable storage medium storing the program therein. It is needless to say that the program can be distributed via a transmission medium such as the Internet.

The invention claimed is:

1. A position detection method of detecting a position of a robot in relation to a target object, the robot including an arm, the method comprising:
   (a) causing the arm, on which a contacting structure is disposed, to position the contacting structure laterally in a horizontal direction in relation to a first detection subject that is one of at least two detection subjects disposed on the target object;
   (b) causing the arm to move the contacting structure laterally to bring the contacting structure into contact with at least three locations on a surface which is a circular detection hole of the first detection subject;
   (c) detecting positions of the contacting structure in relation to the robot when the contacting structure comes into contact with the at least three locations of the detection hole, respectively;
   (d) detecting a position of the first detection subject in relation to the robot using the detected at least three positions of the contacting structure, each of the detected at least three positions of the contacting structure having a corresponding center axis, the center axis of each of the at least three positions being used to define a circular shape, a center of the circular shape being a center of the circular detection hole;
   (e) performing same steps as the steps (a) to (d) for another detection subject, different from the first detection subject, of the at least two detection subjects;
   (f) detecting the position of the robot in relation to the target object using the positions of the at least two detection subjects in relation to the robot and using positions of the at least two detection subjects in relation to the target object; and
   (g) causing the arm to perform an operation of indicating a type of control that is currently being performed among multiple types of control corresponding to respective target objects.

2. The position detection method according to claim 1, wherein:
   each of the at least two detection subjects is one of a recess or a projection, the projection being insertable in the recess,
   the contacting structure is the other of the recess or the projection, and
   the method includes, in the step (a), positioning the contacting structure laterally in relation to the first detection subject by moving the contacting structure such that the projection is inserted in the recess.

3. The position detection method according to claim 1, including, in the step (f), detecting the position and an orientation of the robot in relation to the target object.

4. The position detection method according to claim 1, wherein:
   the arm includes at least two joints, and
   the method includes, in the step (b), at each of the at least three locations, performing a first operation of operating a first joint, which is one of the at least two joints, to bring the contacting structure into contact with the surface of the first detection subject, and then performing a second operation of operating a second joint, which is another one of the at least two joints, to bring the contacting structure into contact with the surface of the first detection subject.

5. The position detection method according to claim 4, wherein:
   the first joint and the second joint enable the arm to operate in a manner to move the contacting structure laterally.

6. The position detection method according to claim 4, further including:
   in the first operation, lowering a gain of a second servomotor that drives the second joint than a gain of a first servomotor that drives the first joint; and
   in the second operation, lowering the gain of the first servomotor than the gain of the second servomotor.

7. The position detection method according to claim 1, further comprising:
   (a1) causing the arm to position the contacting structure to a position above a peripheral surface around the first detection subject;
   (b1) causing the arm to lower the contacting structure to bring the contacting structure into contact with at least one location on the peripheral surface;
   (c1) detecting a height position of the contacting structure when the contacting structure comes into contact with each of the at least one location, the height position being a position of the contacting structure in a height direction in relation to the robot;
   (d1) detecting a height position of the first detection subject in relation to the robot using the detected at least one height position of the contacting structure; and
   (e1) detecting a height position of the robot in relation to the target object using the height position of the first detection subject in relation to the robot.

8. A controller for performing the position detection method according to claim 1, wherein the controller:

performs the step (a) in accordance with manipulation information outputted from a manipulation input device with which to manipulate the robot, the manipulation input device receiving an input of a manipulation of the robot; and performs the steps (b) to (f) autonomously in accordance with a program.

9. A controller for performing the position detection method according to claim 1, wherein:

the controller performs the steps (a) to (f) autonomously in accordance with a program.

10. A robot system comprising:

a controller that performs the position detection method according to claim 1 and controls an operation of the robot; and the robot.

11. The robot system according to claim 10, wherein the controller:

performs the step (a) in accordance with manipulation information outputted from a manipulation input device with which to manipulate the robot, the manipulation input device receiving an input of a manipulation of the robot; and performs the steps (b) to (f) autonomously in accordance with a program.

12. The robot system according to claim 10, wherein:

the controller performs the steps (a) to (f) autonomously in accordance with a program.

\* \* \* \* \*